(12) United States Patent
Barale et al.

(10) Patent No.: US 12,525,074 B2
(45) Date of Patent: Jan. 13, 2026

(54) METHOD AND SYSTEM FOR DETECTING AND PROVIDING INFORMATION REPRESENTATIVE OF PARTICULATE EMISSIONS DUE TO THE USE OF A BRAKING SYSTEM OF A VEHICLE

(71) Applicant: BREMBO S.p.A., Curno (IT)

(72) Inventors: Pietro Barale, Curno (IT); Matteo Federici, Curno (IT); Valerio Galizzi, Curno (IT); Mattia Lorenzetti, Curno (IT); Elena Mazzoleni, Curno (IT); Nicolò Nepote, Curno (IT); Micael Rescati, Curno (IT); Gabriele Riva, Curno (IT)

(73) Assignee: Brembo S.p.A., Bergamo (IT)

( * ) Notice: Subject to any disclaimer, the term of this patent is extended or adjusted under 35 U.S.C. 154(b) by 38 days.

(21) Appl. No.: 18/721,228

(22) PCT Filed: Dec. 9, 2022

(86) PCT No.: PCT/IB2022/061978
§ 371 (c)(1),
(2) Date: Jun. 18, 2024

(87) PCT Pub. No.: WO2023/119044
PCT Pub. Date: Jun. 29, 2023

(65) Prior Publication Data
US 2025/0061755 A1    Feb. 20, 2025

(30) Foreign Application Priority Data
Dec. 23, 2021    (IT) .................. 102021000032402

(51) Int. Cl.
G07C 5/08    (2006.01)
G07C 5/00    (2006.01)

(52) U.S. Cl.
CPC ........... *G07C 5/0825* (2013.01); *G07C 5/008* (2013.01); *G07C 5/0808* (2013.01); *G07C 5/085* (2013.01)

(58) Field of Classification Search
None
See application file for complete search history.

(56) References Cited

FOREIGN PATENT DOCUMENTS

DE    102016105135 A1    9/2016
DE    102017109356 A1    11/2018
(Continued)

OTHER PUBLICATIONS

European Patent Office, International Search Report, issued in PCT/IB2022/061978, Feb. 20, 2023, Rijswijk, NL.

*Primary Examiner* — Abdhesh K Jha
(74) *Attorney, Agent, or Firm* — Marshall & Melhorn, LLC

(57) ABSTRACT

A method for detecting and providing information representative of particulate emissions of a braking system of a vehicle involves acquiring, by a portable electronic device, identification data of the vehicle entered by a driver, acquiring, by a plurality of sensors, driving data of the vehicle, storing in a memory module, by a data processing module, the acquired driving data as a first time series of points, sending to a remote computer the driving data, and performing a first processing of the received driving data to determine a representation of the driving data as a second time series of points. The method further involves determining a value of a first physical magnitude and a value of a second physical magnitude of the braking system, determining one or more values representative of the particulate emission and providing the driver with the determined one or more values representative of the particulate emission.

21 Claims, 6 Drawing Sheets

(56) References Cited

FOREIGN PATENT DOCUMENTS

DE      102017210687 A1    12/2018
DE      102018207298 A1 * 11/2019  ............ B60T 8/1766
DE      102019218638 B3    3/2021

* cited by examiner

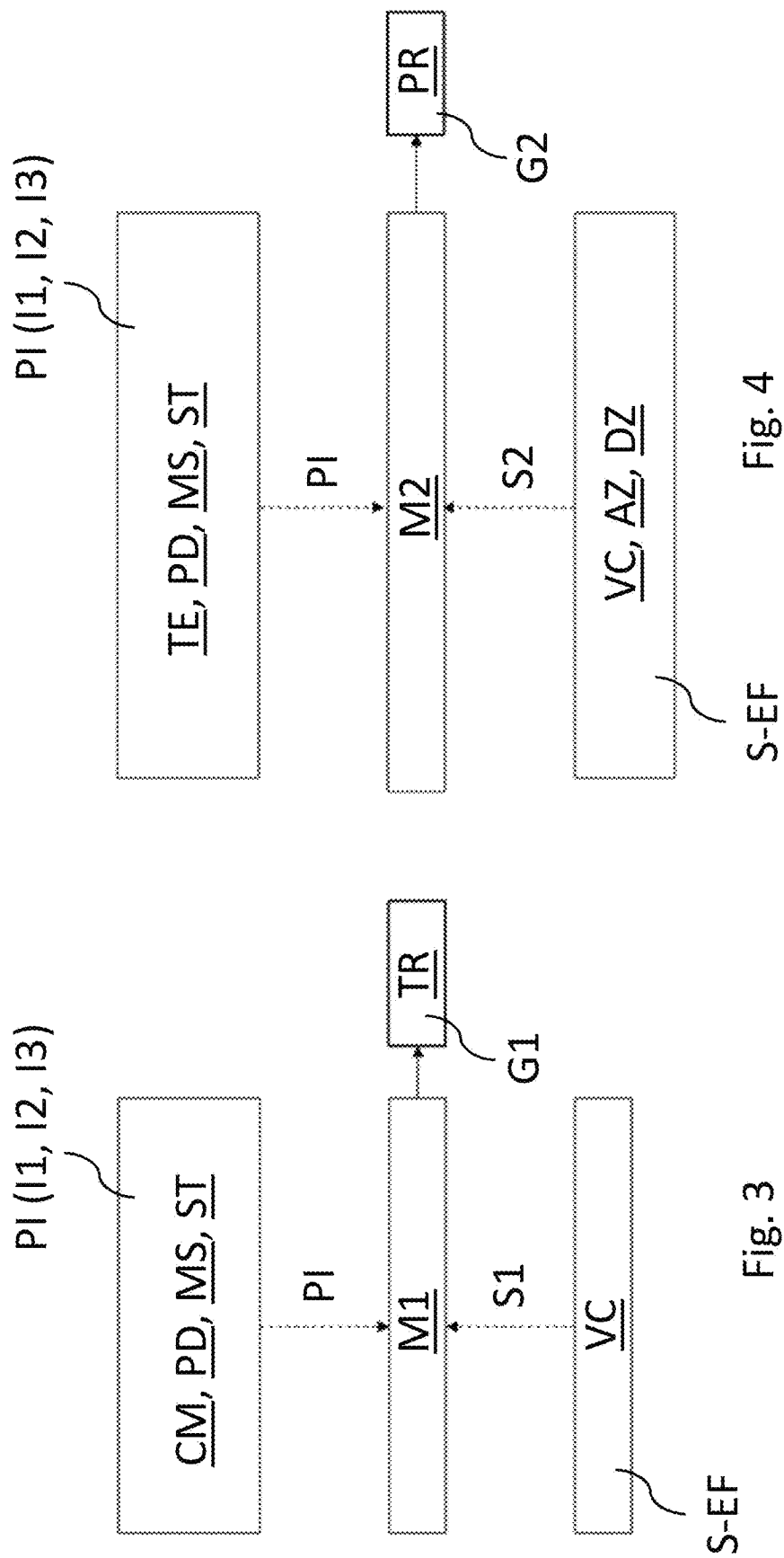

METHOD AND SYSTEM FOR DETECTING AND PROVIDING INFORMATION REPRESENTATIVE OF PARTICULATE EMISSIONS DUE TO THE USE OF A BRAKING SYSTEM OF A VEHICLE

FIELD OF THE INVENTION

The present invention relates to a method and related system for detecting and providing information representative of particulate emissions due to the use of a braking system of a vehicle.

BACKGROUND ART

For some time now, the European Union (EU) and the World Health Organization (WHO) have been working for reducing particulate emissions (EP) by providing guidelines, regulations, and standards.

Road transport is certainly one of the domains in which some of the largest particulate sources can be identified.

In such a domain, the major regulatory and technological efforts in recent years have mainly focused on reducing exhaust emissions due to exhaust gases, while little has been done to limit so-called non-exhaust emissions, e.g., deriving from brake wear (in which particulate matter results from material wear due to sliding contact between brake pads and brake disc during braking) and tire wear.

Non-exhaust emissions depend, on the one hand, on the technology, i.e., the materials used and the general configuration of the braking system, and, on the other hand, on the driver's braking style.

Indeed, from this point of view, it has been verified that certain parameters that are under the exclusive control of the driver, such as the pressure applied by means of the brake pedal on the braking system and the braking speed, greatly influence the particulate emission of the braking system.

Therefore, a very promising approach to reduce the wear emissions of a braking system as a whole consists in focusing on the driving style and braking style in addition to design and structural improvements of the braking system. Indeed, particulate emission considerably varies depending on the driving style and how the driver brakes, the braking system being the same.

Therefore, it would be desirable to have the option of methods to "teach" the driver how to brake correctly to reduce emissions, based on the ability to provide the driver, even in real time while driving, with information about the braking style and the resulting impact in terms of particulate emissions caused.

In this regard, solutions are currently known to characterize the driving style in terms of efficiency in reducing non-exhaust emissions, such as to make the driver aware of his/her braking behavior to reduce non-exhaust emissions due to the braking actions of the braking system.

For example, methods are known to calculate particulate emissions of a braking system by modeling the braking system itself by means of semi-empirical algorithms derived starting from dynamic bench characterizations of the braking system itself.

Operationally, such methods are based on the presence of physical sensors in the vehicle for measuring the physical magnitudes necessary for estimating the emission level of the braking system, such as vehicle speed, and/or vehicle acceleration/deceleration, and/or vehicle braking system temperature, and/or braking pressure, and/or vehicle motor torque, and/or braking torque, vehicle inclination.

Such sensors communicate the detected physical magnitudes to the control unit of the vehicle, which, being configured to execute the aforesaid previously-stored algorithms, provides information representative of particulate emissions due to the use of the braking system of the vehicle, e.g., an index proportional to the estimated particulate emissions based on the applied model which can be displayed by the driver on an on-board computer or other electronic device in the passenger compartment.

These implementation methods are not free from flaws.

First of all, the fact that the aforesaid algorithms must necessarily be stored in the control unit of the vehicle implies that the vehicle must be taken to a dedicated center during installation, which means that the vehicle cannot be used during the configuration period.

In addition, the fact that the aforesaid algorithms physically reside on the vehicle requires any software update to be performed manually at an authorized center.

Therefore, in addition to making the vehicle unusable for the entire period in which it is at the authorized center for the update, it is inevitable that in the control unit there are often algorithms which are not always updated to the latest version, with the risk of experiencing diminished accuracy and precision of the implemented methods. Indeed, an update is carried out to make corrective or ameliorative changes, as well as to adapt to new market trends or to comply with the introduction of new regulations. Therefore, frequent updates would be preferable.

Furthermore, the versatility of the aforesaid method is strongly limited by the fact that the accuracy of the usable algorithms improves as the specificity of vehicle parameters dependent on the vehicle itself (characterized by brand and model) and the respective braking system (characterized by size, materials, and so on) increases, which, regretfully, vary from vehicle to vehicle along with the physical sensors mounted and the respective accuracy.

Again, each control unit with which a vehicle is equipped has specific software characteristics (firmware), and it would be unthinkable to have specific algorithms available to install in each control unit based on the technical specifications of the single vehicle under consideration.

Therefore, to date, the algorithms usable in the aforesaid method of the prior art, in order to be implemented on any vehicle, are limited to taking advantage of the physical magnitudes detectable by a very limited set of physical sensors which are present on average on most vehicles.

Finally, if additional physical sensors are desired, besides those already mounted on the vehicle and already connected to the control unit (if not directly present therein), the configuration or update time (thus the vehicle downtime) would increase, inevitably leading to avoid configuring one's vehicle to make the aforesaid method implementable.

In view of the above, the need is strongly felt today for methods and systems for detecting and providing information representative of particulate emissions due to the use of a braking system of a vehicle, to allow the driver to improve his/her driving and braking style to reduce the non-exhaust emission of the vehicle, which are more accurate, precise, versatile, and continuously updatable in an easy and timely manner.

SUMMARY OF THE INVENTION

It is the object of the present invention to devise and provide a method for detecting and providing information representative of particulate emissions due to the use of a braking system of a vehicle which allows obviating, at least partially, the drawbacks complained above with reference to the prior art, and in particular which allows the driver to improve his/her driving and braking style to reduce the non-exhaust emission of the vehicle, which is more accurate, precise, versatile, and continuously updatable in an easy and timely manner.

Such an object is achieved by a method for detecting and providing information representative of particulate emissions due to the use of a braking system of a vehicle as described and claimed herein.

The present invention further relates to a system for detecting and providing information representative of particulate emissions due to the use of a braking system of a vehicle adapted to implement the aforesaid method.

Further advantageous embodiments of the method and system are also described.

BRIEF DESCRIPTION OF THE DRAWINGS

Further features and advantages of the method and system according to the invention will become apparent from the following description of preferred embodiments, given by way of indicative, non-limiting examples, with reference to the accompanying drawings, in which:

FIGS. 3, 4, and 5 show from a logical point of view, by means of respective functional block diagrams, components of the system of the present invention;

It is worth noting that equal or similar elements in the figures will be indicated by the same numeric or alphanumeric references.

DETAILED DESCRIPTION

Figure 1:
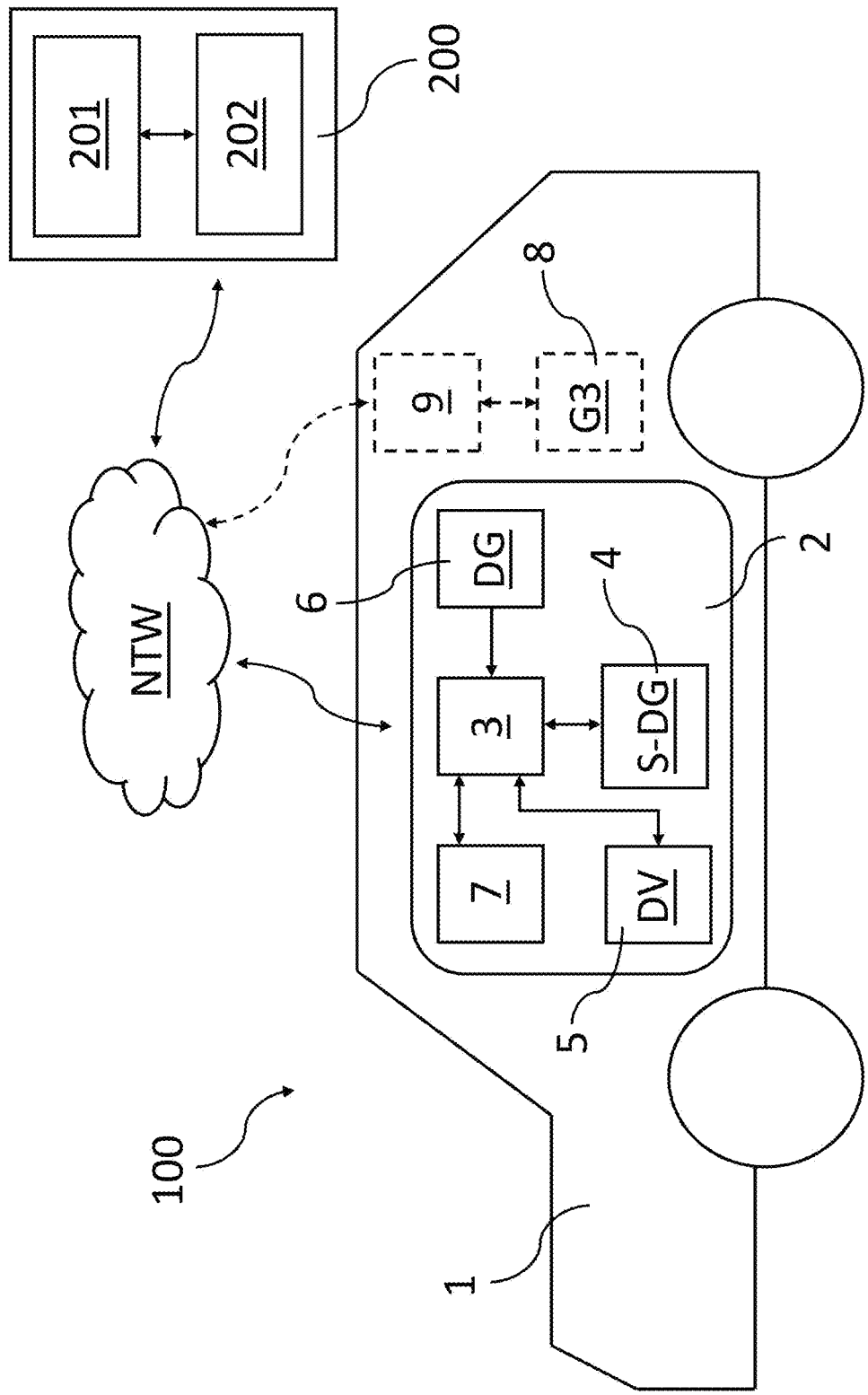
FIG. 1 shows, by means of a block diagram, a method for detecting and providing information representative of particulate emissions due to the use of a braking system of a vehicle according to the present invention.

With reference now to the aforesaid figures, reference numeral 100 indicates as a whole a system for detecting and providing information representative of particulate emissions due to the use of a braking system of a vehicle, hereinafter also simply detecting and providing system or simply system, according to the present invention.

For the purposes of the present description, "vehicle" means any vehicle or motorcycle, also of commercial type, having two, three, four, or more wheels, shown only diagrammatically in FIG. 1 and indicated as a whole by reference numeral 1.

Furthermore, "braking system" means the whole of all the components (mechanical and/or electric or electronic, also the brake fluid) which contribute to generating the service braking of a vehicle or to generating the parking-braking of a vehicle.

Referring to FIG. 1, the system 100 comprises a portable electronic device 2 in the vehicle, hereafter also simply portable electronic device 2.

The portable electronic device 2 in the vehicle is a portable electronic device of the driver (e.g., a smartphone, tablet, smartwatch, and so on) on which a software application (application or app) can be installed which allows the portable electronic device 2 to be an integral part of the implementation of the system 100, as will be described below.

Portable electronic device "in the vehicle" means that the portable electronic device 2 is present inside the passenger compartment of the vehicle 1, leaving it free to move around inside the passenger compartment during the trip of the vehicle 1 (e.g., resting on the passenger seat, if vacant, or in a glove box or other holder in vehicle 1) or attaching it to the vehicle, e.g., to the dashboard.

As shown in FIG. 1, the portable electronic device 2 comprises at least one data processing module 3, e.g., a microprocessor or a microcontroller.

The portable electronic device 2 further comprises at least one memory module 4 operatively connected to said at least one the data processing module 3.

The at least one memory module 4 may be either internal or external (e.g., as shown in FIG. 1) to the at least one data processing module 3.

It is worth noting that at least one memory module 4 is configured to store one or more program codes (also including the software application introduced above) executable by the at least one data processing module 3 to perform respective functions of the portable electronic device 2 including those needed for implementing the system 100 of the present invention.

The portable electronic device 2 further comprises a user interface 5 (display) operatively connected to the data processing module 3.

The user interface 5 is configured to allow the driver to interact with the portable electronic device 2 and, in particular, during the implementation of the system 100, to be able to view information representative of particulate emissions due to the use of the braking system of a vehicle 1.

Figure 5:
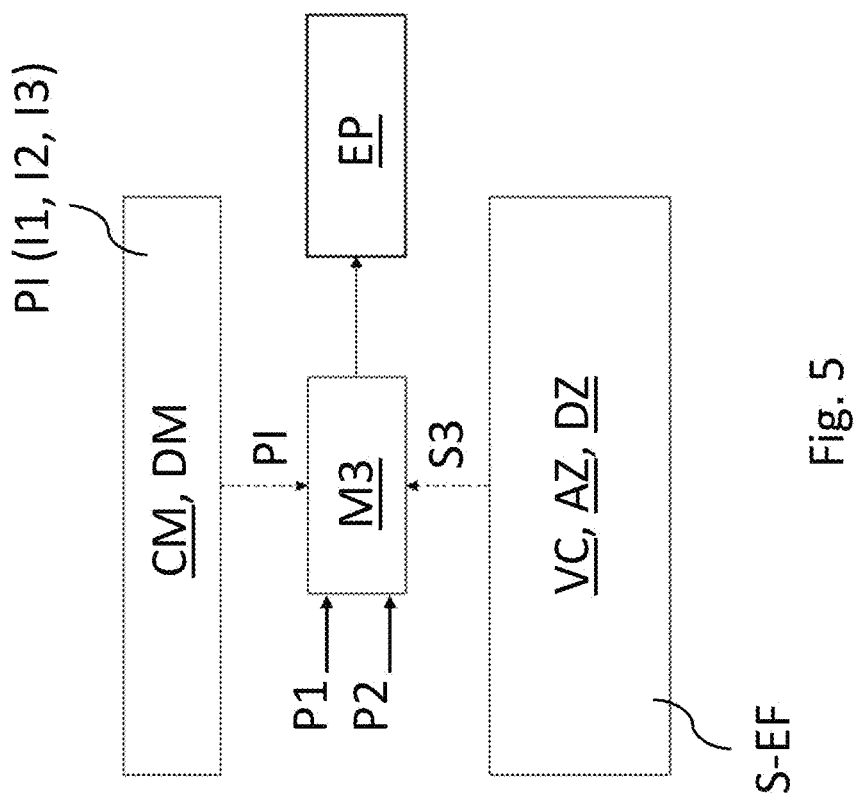
Figure 7:
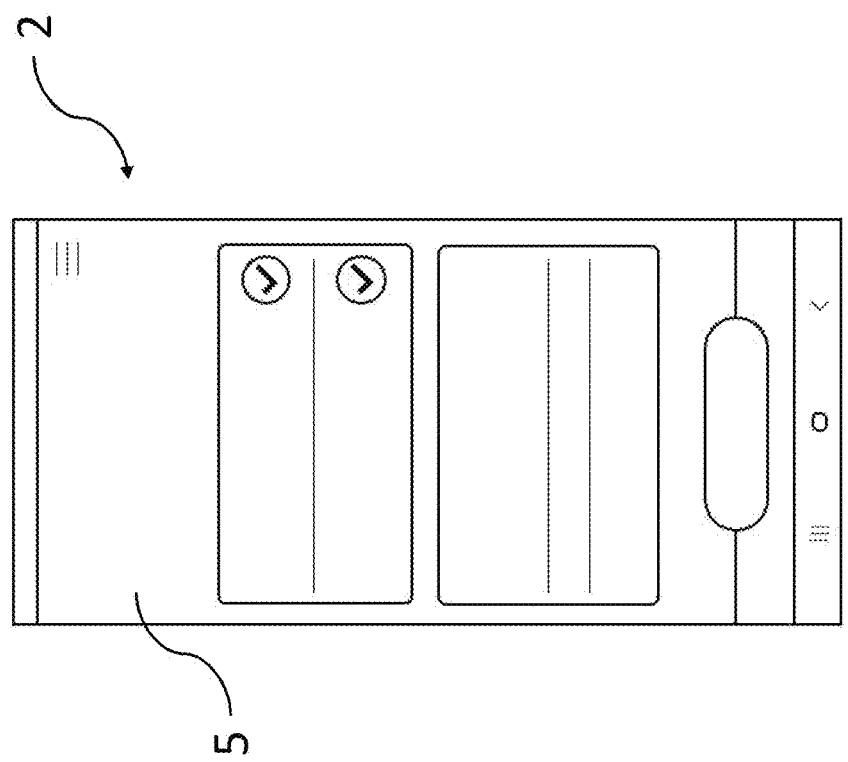
FIG. 7 shows an example of a user interface, included within the system of the present invention, for displaying to the user information representative of particulate emissions due to the use of a braking system of a vehicle.

An example of user interface 5 of the portable electronic device 2 is shown diagrammatically in FIG. 5.

The portable electronic device 2 is configured to acquire identification data DV of the vehicle 1, entered by the driver of the vehicle 1.

The identification data DV of the vehicle 1 can be entered by means of the user interface 5, in particular by means of a software application, described below, installed on the portable electronic device 2 in the vehicle 1 to allow it to be employable in the system 100.

The identification data DV of the vehicle 1, as will also be described below, is necessary for the implementation of the system 100.

The identification data DV of the vehicle 1 comprise information identifying the type of vehicle, including:

the brand of the vehicle 1;

the model of the vehicle 1;

the segment of the vehicle 1.

Turning back to FIG. 1, the portable electronic device 2 further comprises a plurality of sensors 6 (diagrammatically shown in the figure with a single block, for the sake of simplicity of representation) operatively connected to at least one data processing module 3.

The plurality of sensors 6 is configured to acquire driving data DG of the vehicle 1 during the trip of the vehicle 1.

The plurality of sensors 6 comprises at least one GPS module, one magnetometer (compass), one accelerometer, and one gyroscope with which the portable electronic device 2 is equipped.

The driving data DG of the vehicle 1, which can be acquired by the plurality of sensors 6 during the trip of the vehicle 1 and the possible movement of the portable electronic device 2, comprise:

the location (latitude and longitude) of the vehicle 1;
the speed of the vehicle 1;
the acceleration of the vehicle 1;
the altitude of the vehicle 1.

In this regard, the at least one data processing module 3 of the portable electronic device 2 is configured to store in the at least one memory module 4 of the portable electronic device 2 the acquired driving data DG of the vehicle 1 as a first time series S-DG of points in which each point has respective driving data DG of the vehicle 1 associated therewith.

Again with reference to FIG. 1, the portable electronic device 2 comprises at least one data communication module 7 operationally connected to the at least one data processing module 3.

The at least one data communication module 7 comprises one or more data communication units configured to allow the portable electronic device 2 to establish at least one direct wireless connection (e.g., in Wi-Fi, Bluetooth, NFC, or similar technology) directly with another device and at least one wireless connection with a data communication network, diagrammatically shown in FIG. 1 and indicated by reference symbol NTW, e.g., the Internet, to communicate remotely with other remote devices or equipment.

In this regard, the portable electronic device 2, by means of the at least one data communication module 7, is configured to establish a data communication channel in wireless mode with the vehicle 1, e.g., by employing Bluetooth technology.

Furthermore, the portable electronic device 2, by means of the at least one data communication module 7, is configured to communicate data to a remote computer, described below, by means of the data communication network NTW.

Turning back to FIG. 1, the system 100 further comprises a remote computer 200, e.g., a cloud server or on-premise data center.

The remote computer 200 is configured to communicate data with the portable electronic device 2 in the vehicle by means of the data communication network NTW.

With reference to FIG. 1, the remote computer 200 comprises at least one data processing unit 201, e.g., a microprocessor or a microcontroller.

The remote computer 200 further comprises at least one memory unit 202 operatively connected to said at least one the data processing unit 201.

The at least one memory unit 202 may be either internal or external (e.g., as shown in FIG. 1) to the at least one data processing unit 201.

It is worth noting that at least one memory unit 202 is configured to store one or more program codes executable by the at least one data processing unit 201 to perform respective functions including those needed for implementing the system 100 of the present invention.

Returning to the portable electronic device 2 in the vehicle, it is configured to send to the remote computer 200, during the trip of the vehicle 1, the driving data DG of the vehicle 1 stored as the first time series S-DG in the at least one memory module 4 of the portable electronic device 2 in the vehicle.

The data processing unit 201 of the remote computer 200 is configured to perform a first processing of the received driving data DG of the vehicle 1 to determine a representation of the driving data DG of the vehicle as a second time series S-EF of points, each representative of an actual braking event, each point having respective driving data DG of the vehicle 1 associated therewith.

Furthermore, the data processing unit 201 of the remote computer 200 is configured to store the second time series S-EF of points each representative of an actual braking event EF in the memory unit 202 of the remote computer 200.

By way of example, the second time series S-EF is stored in the form of a table in which each row of the table represents a point in the series representative of a braking event EF. The row will contain the driving data DG of the vehicle 1 corresponding to that braking event.

This table is obtainable by processing a previous table previously stored in the memory unit 202 of the remote computer 200 in which each row corresponds to a point of the time series S-DG received from the portable electronic device 2 in the vehicle.

The rows in the table (series points) correspond to acquisitions made at regular time intervals, e.g., every second.

For example, a braking event lasting 10 seconds will be represented in the series with the driving data GD of the vehicle 1 corresponding to 10 points.

Therefore, the table in which the second time series S-EF is contained can thus contain on one row the driving data DG of the vehicle 1 corresponding to the braking event as an aggregation of the driving data GD of the vehicle 1 present on the 10 rows.

Figure 6:
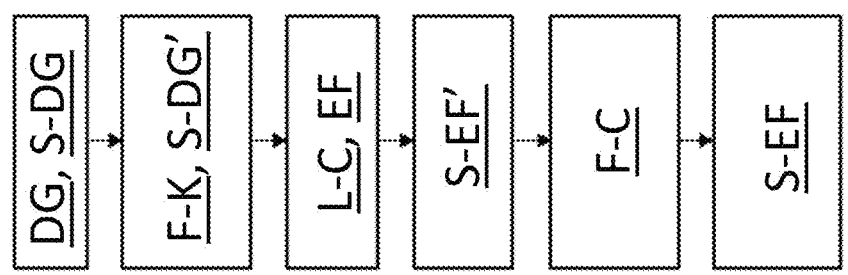
FIG. 6 shows, by means of a block diagram, a sequence of operations carried out by a component of the system of the present invention.

According to an embodiment, with particular reference to FIG. 6 as well, the execution by the at least one data processing unit 201 of the remote computer 200, of the aforesaid first processing comprises the following operations.

The data processing unit 201 of the remote computer 200 is configured to apply at least one noise reduction filter F-K, such as a Kalman filter, to the received first time series S-DG of points (raw vehicle driving data DG 1) to reduce noise and increase the quality thereof, to obtain an intermediate time series S-DG' of points in which each point has driving data DG of the vehicle 1 associated therewith.

Furthermore, the data processing unit 201 of the remote computer 200 is configured to identify, within the filtered first intermediate time series S-DG', by means of the application of a set control logic L-C, the points corresponding to a braking event EF based on the driving data DG of the vehicle 1 associated with each point.

For example, such an identification can be done by comparing the deceleration data of the vehicle 1 with a deceleration threshold value. This deceleration threshold value can be a fixed value or a variable value as a function of the vehicle speed 1.

According to another example, such an identification can be performed by having available a representative datum of the brake pedal travel of the vehicle 1, if this datum is available because it is provided by an electronic control unit and/or a specific sensor of the vehicle 1.

Furthermore, the data processing unit 201 of the remote computer 200 unit is configured to determine a further intermediate time series S-EF' of points each corresponding to an actual braking event EF by aggregating together the identified points corresponding to a braking event EF, each point having respective driving data DG of the vehicle 1 associated therewith.

Furthermore, the data processing unit 201 of the remote computer 200 is configured to apply a correctness and consistency check filter F-C to the further intermediate time series S-EF' to eliminate points corresponding to errors and obtain the second time series S-EF (final dataset) of points.

For example, if the speed data of the vehicle 1 is present in the driving data DG of the vehicle 1 associated with a point in the further intermediate time series S-EF', this data can be compared with the maximum permissible speed values for the type of the vehicle 1 declared by the driver, and if the speed data is unrealistic (e.g., much higher), with respect to with the maximum permissible speed values for the type of the vehicle 1, then such a point will be removed from the further intermediate time series S-EF'.

Figure 2:
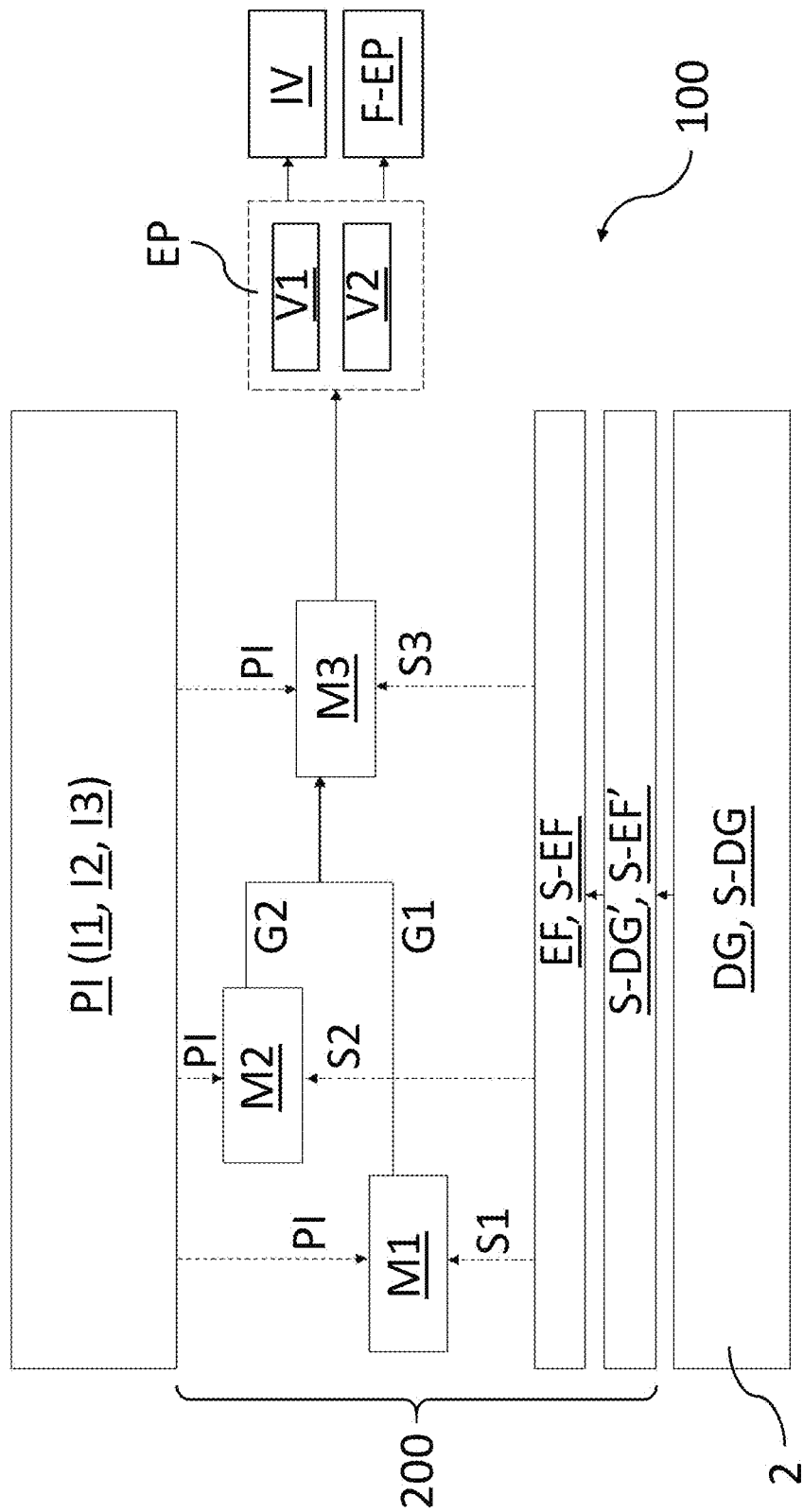
FIG. 2 shows from a logical point of view, by means of a functional block diagram, a system for detecting and providing information representative of particulate emissions due to the use of a braking system of a vehicle according to the present invention.

Turning back to the system 100 in FIGS. 1, 2, the data processing unit 201 of the remote computer 200, for each braking event represented by the points of the second time series S-EF is configured to determine a value of a first physical magnitude G1 of the braking system of the vehicle 1 by applying a first calculation module M1 of said first physical magnitude G1, based on a first subset S1 of the driving data DG of the vehicle 1 of the point of the second time series S-EF corresponding to the braking event EF and one or more pieces of information of a plurality of information PI coming from sources external to the remote computer 200 and the portable electronic device 2 in the vehicle 1.

The plurality of information PI comprises first information 11 representative of the environment in which the vehicle 1 is traveling on the route, second information 12 representative of the road conditions in which the vehicle 1 is traveling on the route, and third information 13 of the production of the vehicle 1.

The first calculation module M1 is an algorithm or mathematical model, representative of a so-called "virtual sensor" for determining the value of the first physical magnitude G1 of the vehicle braking system.

The first subset S1 of the driving data DG of the vehicle 1 to be used as input in the first algorithm or mathematical model M1 depends on the first physical magnitude G1 which can be determined by the first algorithm or mathematical model M1.

The first information 11 representative of the environment in which the vehicle 1 is traveling on the route comprise so-called environmental data, such as:
external temperature with respect to the vehicle 1;
weather conditions;
moisture level outside the vehicle 1;
$PM_{10}$ level (mass in mg of particles in the air having a diameter of 10 micrometers or less).

The first information 11 are detected at the position of the vehicle 1 as indicated by the GPS present inside the portable electronic device 2 in the vehicle 1.

It is worth noting that the first information 11 can be obtained from remote computer 200 by querying specific external services reachable, e.g., by means of a respective network address known to the remote computer 200.

The second information 12 representative of the road conditions in which vehicle 1 is traveling on the route comprise:
the type of road (urban, suburban, highway, and so on) on which the vehicle is transiting;
the slope of the road on which the vehicle 1 is transiting;
the altitude of the road on which the vehicle 1 is transiting;
the road traffic conditions.

The third information 13 of the production the vehicle 1 comprise:
the weight of the vehicle 1;
technical specifications of the braking system of the vehicle 1 (e.g., brake disc size, brake caliper type, wheelbase of the vehicle 1, center of gravity of the vehicle 1, and many others).

It is worth noting that also the second information 12 are obtainable from remote computer 200 by querying specific external services reachable, e.g., by means of a respective network address known to the remote computer 200.

The third information 13 are determined by the data processing unit 201 of the remote computer 200 according to the identification data DV of the vehicle 1 entered by the driver into the portable electronic device 2 in the vehicle 1 by means of the user interface 5.

It is worth noting that the one or more pieces of information of a plurality of information PI to be used as input in the first calculation module M1 depends on the first physical magnitude G1 determinable by the first calculation module M1.

An embodiment of the determination of the first physical magnitude G1 will be described below with reference to FIG. 3.

Turning back to the system 100 in FIGS. 1 and 2, the data processing unit 201 of the remote computer 200, for each braking event represented by the points of the second time series S-EF is configured to determine a value of a second physical magnitude G2 of the braking system of the vehicle 1 by applying a second calculation module M2 of said second physical magnitude G2, based on a second subset S2 of the driving data DG of the vehicle 1 of the point of the second time series S-EF corresponding to the braking event EF and one or more pieces of information of said plurality of information PI coming from sources external to the remote computer 200 and the portable electronic device 2 in the vehicle 1.

The second calculation module M2 is an algorithm or mathematical model.

The second calculation module M2 is an algorithm or mathematical model, representative of a so-called "virtual sensor" for determining the value of the second physical magnitude G2 of the braking system of the vehicle 1.

The second subset S2 of the driving data DG of the vehicle 1 to be used as input in the second calculation module M2 depends on the second physical magnitude G2 determinable by the second calculation module M2.

It is worth noting that the one or more pieces of information 11 of a plurality of information PI to be used as input in the second calculation module M2 depends on the second physical magnitude G2 determinable by the second algorithm or mathematical model M2.

An embodiment of the determination of the second physical magnitude G2 will be described below with reference to FIG. 4.

Turning back to the system 100 in FIGS. 1 and 2, the data processing unit 201 of the remote computer 200, for each braking event represented by the points of the second time series S-EF is further configured to determine one or more values representative of the particulate emission EP by applying a third calculation module M3 of particulate emission, based on a third subset S3 of the driving data DG of the vehicle 1 of the point in the second time series S-EF corresponding to the braking event EF, the value of the first physical magnitude PR of the vehicle braking system 1, the value of the second physical magnitude TR of the braking system 1, and one or more pieces of information of said plurality of information PI coming from sources external to the remote computer 200 and the portable electronic device 2 in the vehicle 1.

In an embodiment, the one or more values representative of particulate emission EP which can be determined by means of the third calculation module M3 comprises a value V1 representative of the mass of particulate matter particles having a diameter less than or equal to a set value (level of $PM_{10}$—mass in mg of particles in the air having a diameter of 10 micrometers or less) and/or a value V2 representative of the number particles in the air having a diameter either less than or equal to a set value (level of $PN_{10}$—number of particles in the air having a diameter of 10 micrometers or less).

The third calculation module M3 is an algorithm or mathematical model.

The third calculation module M3 is an algorithm or mathematical model, representative of a so-called "virtual sensor" for determining the value V1 representative of the mass of particulate matter particles having a diameter less than or equal to a set value ($PM_{10}$ level) and/or the value V2 representative of the number of particulate matter particles having a diameter less than or equal to a set value ($PN_{10}$ level).

The third subset S3 of the driving data DG of the vehicle 1 to be used as input in the third calculation module M3 depends on the first physical magnitude G1 determinable from the first calculation module M1 and the second physical magnitude G2 determinable from the second calculation module M2.

It is worth noting that the one or more pieces of information 11 of a plurality of information PI to be used as input in the third calculation module M3 depends on the first physical magnitude G1 determinable by the first calculation module M1 and the second physical magnitude G2 determinable by the second calculation module M2.

In this regard, an embodiment of the determination of said at least one value representative of particulate emission EP will be described below with reference to FIG. 5.

It is worth noting that the data memory unit 202 of the remote computer 200 is configured to store in a respective database (either inside or outside the remote computer 200) the value of the first physical magnitude G1 determined by the first calculation module M1, the value of the second physical magnitude G2 determined by the second calculation module M2 and the one or more values representative of the particulate emission EP determined by the third calculation module M3.

At a general level, it is worth noting that the data processing unit 201 of the remote computer 200 is configured to relate the one or more pieces of information of said plurality of information PI with the data from respective databases (either internal or external to the remote computer 200), prepared in advance, to derive values and/or calculation coefficients to be provided to the is said first M1, second M2 and third M3 calculation modules.

In other words, a table of data corresponding to the one or more pieces of information from said plurality of information PI is related to a table of data from a respective database, and by mutually cross-referencing these data, it is possible to derive the corresponding calculation coefficients to be used for that specific of the combination of cross-referenced data with each other.

"Relating" means assigning, tying together the one or more pieces of information of said plurality of information PI with the data in the respective databases prepared earlier so as to derive values and/or calculation coefficients to be provided to the aforementioned first M1, second M2 and third M3 calculation modules which allow them to enrich the value estimated/calculated by the respective calculation module ("virtual sensor").

For example, a database comprising representative weather data can be obtained by employing a specific (climate-controlled) bench to carry out experimental tests under controlled conditions which reproduce different weather situations in terms of humidity, and the presence of snow or rain.

Furthermore, a database comprising representative data of experimental parameters of the vehicle can be prepared based on the brake disc/pad material pair related to the braking system mounted on the vehicle 1 declared by the driver.

Such a database is correlated, for example, to the brand and model of the vehicle 1.

For example, if the driver declares to have a vehicle 1 of brand A and model B, from the aforesaid database it is possible to trace back the type of braking system of the vehicle 1, which involves the use of set materials, for which set experimental coefficients relating to particulate emissions are available.

When determining said one or more values representative of particulate emission EP, the data processing unit 201 of the remote computer 200, for the vehicle 1 declared by the driver, will employ the set experimental coefficients in the first M1, second M2 and third M3 calculation modules.

Returning again to the system 100 in FIGS. 1 and 2, the data processing unit 201 of the remote computer 200 is configured to provide the driver with the determined one or more values representative of particulate emission EP due to the braking event EF in real time.

In an embodiment, shown in FIG. 3, the first physical magnitude G1 is a temperature TR of the braking system of the vehicle 1.

"Temperature TR of the braking system of the vehicle 1" means the temperature of a component of the braking system of the vehicle 1, e.g., such as a front brake disc, a rear brake disc, a brake caliper of each corner of the vehicle 1, the brake fluid.

In this embodiment, the first subset S1 of the driving data DG of the vehicle comprises:

the speed VC of the vehicle 1.

In this embodiment, within the plurality of information PI:
- said first information 11 comprise weather conditions CM;
- said second information 12 comprise the slope PD of the road on which vehicle 1 is transiting;
- said third information 13 comprise: weight of the vehicle 1; technical specifications ST of the braking system of the vehicle 1.

Byway of a non-limiting example, if the temperature TR of the braking system of the vehicle 1 is the temperature of the brake disc (e.g., front), such a temperature TR can be determined as a function of the history (summation) of kinetic energy dissipated on the brake disc times the thermal capacity of the material (CP) from which the product of the heat transfer coefficient (h) times the elapsed time since the previous braking ($t_b$) must be subtracted, as also indicated by the following formula:

$$TR = \left(\sum\nolimits_{0}^{i} \Delta kinetic_{energy} * CP - h * t_b\right)$$

In an embodiment, in combination with the preceding one, shown in FIG. 4, the second physical magnitude G2 is a pressure PR present in the braking system of the vehicle 1, e.g., the brake fluid pressure in the master cylinder.

In this embodiment, the second subset S2 of the driving data DG of the vehicle comprises:
 the speed VC of the vehicle 1;
 the acceleration AZ of the vehicle 1;
 the deceleration DZ of the vehicle 1.

In this embodiment, within the plurality of information PI:
 said first information 11 comprise the temperature TE eternal to the vehicle 1;
 said second information 12 comprise the slope PD of the road on which vehicle 1 is transiting;
 said third information 13 comprise: weight of the vehicle 1; technical specifications ST of the braking system of the vehicle 1.

As a non-limiting example, the pressure PR present in the braking system of the vehicle 1 (e.g., brake fluid pressure in the brake master cylinder) can be determined as the product between a system coefficient 5 which can be derived directly from vehicle parameters known from external databases (e.g., such as brake caliper size) and average deceleration of the vehicle (Avg_deceleration), as also indicated by the following formula:

$$PR = \delta \cdot Avg\_deceleration$$

In an embodiment, in combination with the preceding ones, shown in FIG. 5, the third calculation module M3 has as input the temperature value TR determined by the first calculation module M1 and the pressure value PR determined by the second calculation module M2.

In this embodiment, the third subset S3 of the vehicle driving data DG comprises:
 the speed VC of the vehicle 1;
 the acceleration AZ of the vehicle 1;
 the deceleration DZ of the vehicle 1.

In this embodiment, within the plurality of information PI:
 said first information 11 comprise weather conditions CM;
 said second information 12 do not comprise any information;
 said third information 13 comprise: technical data DM referring to the is materials of the brake pad and brake disc of the vehicle 1.

Byway of a non-limiting example, a value representative of particulate emission EP is determined as a function of the linear combination of two factors, a first factor as a function of the temperature TR of the brake disc at the end of braking α(TR) and a second factor β as a function of the average deceleration of the vehicle β(Avg_deceleration), to which a term y, known per se, is added, which depends on the properties of the material of the brake disc, as also shown in the following formula:

$$EP = \alpha(TR) + \beta(Avg\_deceleration) + \gamma$$

On a general level, it is worth pointing out that having available the technical specifications of the vehicle 1 allows knowing exactly the weight thereof, which has an impact in calculating the changes in kinetic energy of the vehicle 1 associated with the braking event.

Furthermore, being aware of a local and instantaneous value of parameters related to the external environment (e.g., the temperature external to the vehicle, humidity rate, and so on) allows modeling the heat exchange phenomenon between the brake disc and the external environment in a more accurate manner.

This has a strong influence on the temperature value reached by the disc while braking.

In the case of acquisitions conducted instead on electric or hybrid vehicles in which regenerative braking is implemented, it is possible to identify, by means of a respective calculation module (algorithm or mathematical model), which events recognized as a braking event actually involve physical contact between the brake pad and the brake disc.

This information, given as input to the module calculating the first physical magnitude (e.g., temperature), contributes to a more faithful calculation of the temperature reached by the brake disc.

In an embodiment, in combination with any one of the preceding ones and shown in FIG. 2, the data processing unit 201 of the remote computer 200 is configured to determine a braking evaluation index IV based on said determined one or more values representative of particulate emission EP due is to the braking event EF.

The braking evaluation index IV is representative of the driver's braking performance.

By way of example, the braking evaluation index IV can be calculated by employing the following formula:

$$IV = a \cdot X^2 + b \cdot X + c$$

wherein:
X is the difference between the final temperature TR (obtained from the first calculation model M1, "virtual thermal model sensor") and the initial temperature Ti of the brake disc (obtained from external ambient temperature data or sensors physically mounted on the vehicle 1)
"α", "b" are coefficients dependent on the aforesaid average acceleration/deceleration and the initial temperature Ti;
"c", on the other hand, is the particulate emission EP.

In an embodiment, in combination with the preceding one, the data processing unit 201 of the remote computer 200 is configured to provide the driver with the determined braking evaluation value IV.

In an embodiment, in combination with the preceding one, the data processing unit 201 of the remote computer 200 is configured to provide the driver with the determined braking evaluation index IV in real time.

In an embodiment, in combination with any one of the preceding two, the determined braking evaluation index IV can be provided to the driver by means of the user interface 5 of the portable electronic device 2 in the vehicle 1, in particular by means of the application software installed therein to employ the portable electronic device 2 in the vehicle 1 in the implementation of the system 100 and/or by means of a display module in the vehicle 1 operatively connected by means of a data communication network NTW (described above) to the remote computer 200.

For example, the braking evaluation index IV is displayed on the portable electronic device 2 in the vehicle 1 by means of graphical indicators, such as traffic light, speedometer, and so on.

In an embodiment, in combination with any one of the preceding ones, is the data processing unit 201 of the remote computer 200 is configured to determine a factor F-EP of particulate emission of the vehicle 1 during a set trip traveled based on the determined one or more values representative of the particulate emission EP due to the braking event EF for each braking event EF present along the set route.

For example, the emission factor E-EP is expressed as a value V1 representing the mass of particulate matter particles having a diameter either less than or equal to a set normalized value along the set route (e.g., $PM_{10}$/km).

In this embodiment, the data processing unit 201 of the remote computer 200 is configured to determine a distance covered by the vehicle 1 during the set route.

In an embodiment, the data processing unit 201 of the remote computer 200 is configured to determine the distance covered by vehicle 1 during the set route, by means of an additional calculation module M4, based on a plurality of vehicle position data 1 included in the driving data DG of the vehicle acquired by the plurality of sensors 6 of the portable electronic device 2 in the vehicle 1.

If the acquisition frequency of the driving data DG of the vehicle is greater than a set reference frequency value, by way of a non-limiting example, every 3 seconds, the data processing unit 201 of the remote computer 200 is configured to determine the distance covered by vehicle 1 during the set trip by summing the geometric distances of the single acquired position values.

Instead, if the acquisition frequency of the driving data DG of the vehicle 1 were to be lower than the set reference frequency value, due to limitations caused by external factors such e.g., such as the absence of GPS signal, discharged portable electronic device 2 in the vehicle 1, compliance with provisions for the protection of driver privacy, and so on, the set mapped route would appear as a broken line and not as a continuous line, so it would not be possible to accurately and reliably determine the distance covered by vehicle 1 during the set trip because it does not correspond to the actual distance covered by vehicle 1.

Therefore, to make this more accurate, it is necessary to provide as is accurate an estimate as possible of the distance covered by vehicle 1 during the set trip.

In an embodiment, either in combination with or alternatively to the preceding one, the data processing unit 201 of the remote computer 200 is configured to determine the distance covered by vehicle 1 during the set trip as the distance between a starting point and an ending point of a probable route, obtained by making use of external services (e.g., APIs, Application Programming Interfaces, made available by third parties) which allow a vehicle route to be reconstructed correctly, despite not having as many points between the starting point and the ending point.

In an embodiment, as an alternative to the preceding one, the data processing unit 201 of the remote computer 200 is configured to determine the distance covered by vehicle 1 during the set trip by means of a distance correction model.

The distance correction model, starting from a sufficiently large set of examples in which an error is committed considering the distance actually traveled and the length of the broken line obtained by joining GPS signal points on a map, is configured to estimate the committed error, for each road category (urban, suburban, highway and so on).

Therefore, the distance correction model provides a correction parameter, which can be applied, by the data processing unit 201 of the remote computer 200, to the analyzed routes to calculate the distance covered by vehicle 1 during the set trip actually covered starting from the distance based on the broken line determined by the points acquired from the GPS signal.

As previously indicated, the data processing unit 201 of the remote computer 200 is configured to provide the driver with the determined one or more values representative of particulate emission EP due to the braking event EF in real time.

In an embodiment, the determined one or more values representative of the particulate emission EP due to the braking event EF can be provided in real time to the driver by means of the user interface 5 of the portable electronic device 2 in the vehicle 1, in particular by means of the software application is installed therein to employ the portable electronic device 2 in the vehicle 1 in the implementation of the system 100, and/or by means of a display module of the vehicle 1 operatively connected by means of a data communication network NTW (described above) to the remote computer 200.

In an embodiment, in combination any one of the preceding ones, the data processing unit 201 of the remote computer 200 is further configured to provide the driver with the determined factor F-EP of particulate emission.

In an embodiment, in combination with the preceding one, the data processing unit 201 of the remote computer 200 is configured to provide the determined factor F-EP of particulate emission to the driver in real time.

In an embodiment, in combination with one of the preceding two, the determined factor F-EP of particulate emission can be provided to the driver by means of the user interface 5 of the portable electronic device 2 in the vehicle 1, in particular by means of the application software installed therein to employ the portable electronic device 2 about the vehicle 1 in the implementation of the system 100 and/or by means of a display module in the vehicle 1 operatively connected by means of a data communication network NTW (described above) to the remote computer 200.

In an embodiment, in combination with any one of the preceding ones, the data processing unit 201 of the remote computer 200 is further configured to provide the driver with the determined value of the first physical magnitude G1 and the determined value of the second physical magnitude G2.

In an embodiment, in combination with the preceding one, the determined value of the first physical magnitude G1, and the determined value of the second physical magnitude G2 can be provided to the driver by means of the user interface 5 of the portable electronic device 2 in the vehicle 1, in particular by means of the application software installed therein to employ the portable electronic device 2 about the vehicle 1 in the implementation of the system 100 and/or by means of a display module in the vehicle 1 operatively connected by means of a data communication network NTW (described above) to the remote computer 200.

In an embodiment, in combination with any one of those described above, the data processing unit 201 of the remote computer 200 is configured to provide the driver with further information representative of the driving performance of the vehicle 1 by the driver.

The further information representative of the driving performance vehicle 1 by the driver comprise:
- single completed routes;
- global route indicators;
- recorded routes history.

The information about a single completed route can be viewed on a map.

In this case, it involves projecting both intermediate and final magnitudes, calculated by the data processing unit 201 of the remote computer 200, onto a map to view the spatial trends thereof by means of a color scale.

This type of display allows the driver to monitor the actual use of the vehicle 1 and the associated emissions with good spatial and temporal resolution.

The global route indicators can be displayed as numerical values corresponding to particulate emissions related to a chosen route.

Such numerical values may correspond to the emission factor, the average of the braking evaluation index on the braking included in the chosen route, or the sum of the amounts of $PM_{10}$ or $PN_{10}$ on the braking included in the chosen route.

Furthermore, it is also possible to display the average values on the route of some magnitudes of interest among those calculated by the algorithm, e.g., such as the brake disc temperature or the braking system pressure.

On the other hand, as for the recorded trip history, the driver can select a time window and see the distribution of emission factor values related to the trips made in that time interval along with some statistical indices (e.g., maximum, minimum, average).

The aforesaid displays can be made by the driver on a display module operatively connectable, by means of the data communication network NTW, to the remote computer 200 and/or by means of the user interface 5 of the is portable electronic device 2 in the vehicle 1.

Such a display module can also be the portable electronic device 2 in the vehicle 1.

In a further embodiment, the data processing unit 201 of the remote computer 200 is configured to provide the driver with further information representative of the driver's driving style.

The further information representative of the driver's driving style comprise:
- comparison between the driver's driving performance and the local situation of particulate emission levels ($PM_{10}$). It is worth noting that local concentration data of particulate emission levels ($PM_{10}$) as a function of space and time can be retrieved by means of online services.
- at the end of a trip, it is possible to break down the total particulate emissions into two parts: a first part intrinsically due to the characteristics of the vehicle 1 and the braking system of the vehicle 1, and a second part due to the driver's driving style. It is worth noting that the break down is achieved by creating a target particulate emission profile, customized on the vehicle 1, based on speed and acceleration limit values. Everything in excess of the particulate emission budget thus calculated is attributed to the driving style;
- the result of a clustering algorithm which, based on the collected driving data DG of the vehicle 1, places the driver in a homogeneous group by braking style.

In an embodiment, in combination with the preceding one, the further information representative of the driver's driving style can be provided to the driver by means of the user interface 5 of the portable electronic device 2 in the vehicle 1, in particular by means of the application software installed therein to employ the portable electronic device 2 in the vehicle 1 in the implementation of the system 100 and/or by means of a display module in the vehicle 1 operatively connected by means of a data communication network NTW (described above) to the remote computer 200.

According to a further embodiment, shown in FIG. 1 with dashed lines, the system 100 further comprises a second plurality of sensors 8 installed in the vehicle 1.

The second plurality of sensors 8 is configured to acquire at least one value of a further physical magnitude G3 of the braking system of the vehicle 1.

In this embodiment, the system 100 further comprises a communication device 9 installed in the vehicle 1 operatively connected to said second plurality of sensors 8 installed in the vehicle 1.

The communication device 9 is operationally connected to the remote computer 200, by means of the data communication network NTW.

The communication device 9 is configured to provide said at least one value of a further physical magnitude G3 of the braking system of the vehicle 1 to the remote computer 200.

In this embodiment, the data processing unit 201 of the remote computer 200 is configured to determine said at least one value representative of particulate emission EP by applying the third determination calculation module M3 of particulate emission, also based on the value of the additional physical magnitude GR3.

Thereby, if the further physical magnitude G3 were either one or the other between the first physical magnitude G1 or the second physical magnitude G2, the data processing unit 201 of the remote computer 200 would have that value available without having to resort to determination by means of the respective calculation module (M1 or M2).

With reference now to the aforesaid figures and the block diagram in FIG. 9, a method 800 for detecting and providing information representative of particulate emissions due to the use of a braking system of a vehicle 1, hereafter also just detecting and providing method or simply method, is described according to the present invention.

It is worth noting that the components and information mentioned below with the description of the method have already been described previously with reference to the system 100 and will therefore not be repeated for the sake of brevity.

The method 800 comprises a symbolic step of starting STR.

The method 800 comprises a step of acquiring 801, by a portable is electronic device 2 in the vehicle 1, identification data DV of the vehicle 1, entered by the driver of the vehicle 1.

The portable electronic device 2 in the vehicle 1 and the identification data DV of the vehicle 1 were defined and described above.

The method 800 further comprises a step of acquiring 802, by a plurality of sensors 6 of the portable electronic device 2 in the vehicle 1, driving data DG of the vehicle 1 during a trip of the vehicle 1.

The plurality of sensors 6 of the portable electronic device 2 in the vehicle 1 and the driving data DG of the vehicle 1 were defined and described above.

The method 800 further comprises a step of storing 803 in at least one memory module 4 of the portable electronic device 2 in the vehicle 1, by at least one data processing module 3 of the portable electronic device 2 in the vehicle 1, the acquired driving data DG of the vehicle 1 as a first time series S-DG of points in which each point has respective driving data DG of the vehicle 1 associated therewith.

The method 800 further comprises a step of sending 804 to a remote computer 200, by the portable electronic device 2 in the vehicle 1 during the trip of the vehicle 1, the driving data DG of the vehicle 1 stored as a first time series S-DG in the at least one memory module 4 of the portable electronic device 2 in the vehicle 1.

The remote computer 200 and the first time series S-DG were defined and described above.

The method 800 further comprises a step of performing 805, by a data processing unit 201 of the remote computer 200, a first processing of the received driving data DG of the vehicle 1 to determine a representation of the vehicle driving data DG as a second time series S-EF of points, each representative of an actual braking event EF.

Each point has associated respective driving data DG of the vehicle 1.

The second time series S-EF has already been defined and described above.

As already explained above, the second time series S-EF is stored, by the data processing unit 201 of the remote computer 200, in a memory unit 202 of the remote computer 200.

Figure 8:
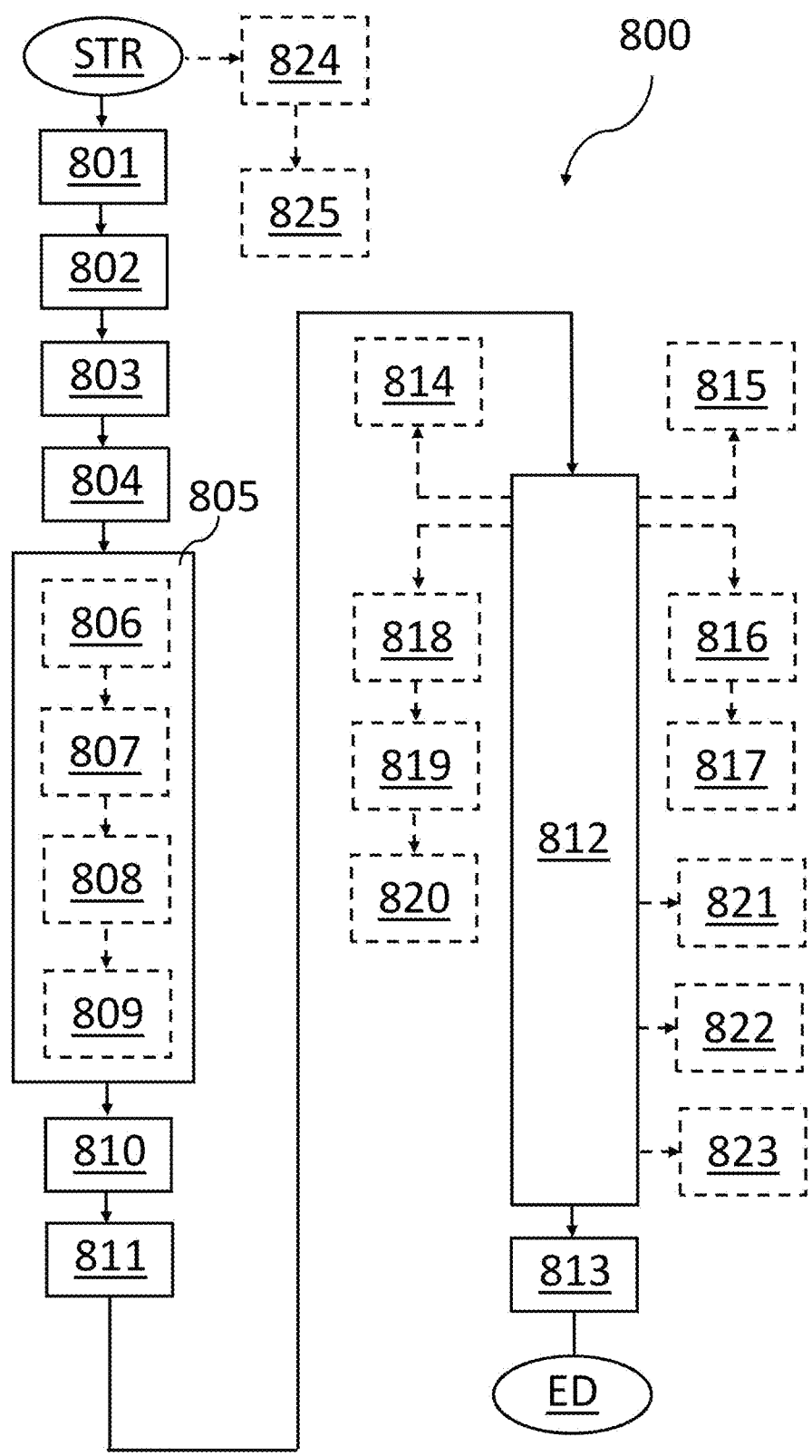
FIG. 8 shows, by means of a block diagram, a method for detecting and providing information representative of particulate emissions due to the use of a braking system of a vehicle of the present invention.

According to an embodiment, shown with dashed lines in FIG. 8, the step of performing 805 a first processing of the received driving data DG of the vehicle 1 to determine a representation of the vehicle driving data DG as a second time series S-EF of points each representative of an actual braking event comprises steps of:

- applying 806 to the received first time series S-DG of points (raw driving data DG of the vehicle 1), by the at least one data processing unit 201 of the remote computer 200, at least one noise reduction filter F-K (e.g., a Kalman filter) to reduce noise and increase quality, to obtain an intermediate time series S-DG' of points in which each point has associated driving data DG of the vehicle 1;
- identifying 807, by the data processing unit 201 of the remote computer 200, within the filtered first intermediate time series S-DG', by means of the application of a set control logic L-C, the points corresponding to a braking event EF based on the driving data DG of the vehicle 1 associated with each point. This identification was written before;
- determining 808, by the data processing unit 201 of the remote computer 200, a further intermediate time series S-EF' of points each corresponding to an actual braking event EF by aggregating together the identified points corresponding to a braking event EF, each point having respective driving data DG of the vehicle 1 associated therewith;
- applying 809 to the further intermediate time series S-EF' by the data processing unit 201 of the remote computer 200, a correctness and consistency check filter F-C to eliminate the points corresponding to errors and obtain the second time series S-EF (definitive dataset) of points.

An example of the application of a correctness and consistency check filter F-C was described earlier.

Returning in general to the method 800 in FIG. 8, for each braking event represented by the points of the second time series S-EF, the method 800 comprises a step of determining 810, by the data processing unit 201 of the remote computer 200, a value of a first physical magnitude G1 of the braking system of the vehicle 1, by applying a first calculation module M1 of said first physical magnitude G1, based on a first subset S1 of the driving data DG of the vehicle 1 of the point of the second time series S-EF corresponding to the braking event EF and one or more pieces of information of a plurality of information PI coming from sources external to the remote computer 200 and the portable electronic device 2 in the vehicle 1.

The plurality of information PI comprises first information 11 representative of the environment in which vehicle 1 is traveling, second information 12 representative of the road conditions in which vehicle 1 is traveling, and third information 13 of the production of the vehicle 1.

The first calculation module M1 is an algorithm or mathematical model ("virtual sensor").

The first subset S1 of the driving data DG of the vehicle 1 to be used as input in the first algorithm or mathematical model M1 depends on the first physical magnitude G1 which can be determined by the first algorithm or mathematical model M1.

An example of the first subset S1 of the driving data DG of the vehicle 1 was given above.

The first information 11, the second information 12 and the third information 13 have been described above.

It is worth noting that the one or more pieces of information of a plurality of information PI to be used as input in the first calculation module M1 depends on the first physical magnitude G1 determinable by the first calculation module M1.

Afterward, again for each braking event represented by the points of the second time series S-EF, the method 800 comprises a step of determining 811, by the data processing unit 201 of the remote computer 200, a value of a second physical magnitude G2 of the braking system of the vehicle 1, by applying a second calculation module M2 of said second physical magnitude G2, based on a second subset S2 of the driving data DG of the vehicle 1 of the point of the second time series S-EF corresponding to the braking event EF and one or more pieces of information of said plurality of information PI coming from sources external to the remote computer 200 and the portable electronic device 2 in the vehicle 1.

The second calculation module M2 is an algorithm or mathematical model ("virtual sensor").

The second subset S2 of the driving data DG of the vehicle 1 to be used as input in the second calculation module M2 depends on the second physical magnitude G2 determinable by the second calculation module M2.

An example of the second subset S2 of the driving data DG of the vehicle 1 was given above.

It is worth noting that the one or more pieces of information of said plurality of information PI to be used as input in the second calculation module M2 depends on the second physical magnitude G2 determinable by the second algorithm or mathematical model M2.

Afterward, again for each braking event represented by the points of the second time series S-EF, the method 800 comprises a step of determining 812, by the data processing unit 201 of the remote computer 200, one or more values representative of the particulate emission EP by applying a third calculation module M3 of particulate emission, based on a third subset S3 of the driving data DG of the vehicle 1 of the point in the second time series S-EF corresponding to the braking event EF, the value of the first physical magnitude PR of the vehicle braking system 1, the value of the second physical magnitude TR of the braking system 1, and one or more pieces of information of said plurality of information PI coming from sources external to the remote computer 200 and the portable electronic device 2 in the vehicle 1.

The one or more values representative of particulate emission EP were provided above, according to a different embodiment.

The third calculation module M3 is an algorithm or mathematical model ("virtual sensor").

The third subset S3 of the driving data DG of the vehicle 1 to be used as input in the third calculation module M3 depends on the first physical magnitude G1 determinable by the first calculation module M1 and the second physical magnitude G2 determinable by the second calculation module M2.

An example of the third subset S3 of the driving data DG of the vehicle 1 was given above.

It is worth noting that the one or more pieces of information 11 of a plurality of information PI to be used as input in the third calculation module M3 depends on the first physical magnitude G1 determinable by the first calculation module M1 and the second physical magnitude G2 determinable by the second calculation module M2.

Turning back again to the method 800 in FIG. 8 in general, the method 800 comprises a step of providing 813 the driver, by the data processing unit 201 of the remote computer 200, with the determined one or more values representative of the particulate emission EP due to the braking event EF in real time.

The method 800 thus comprises a symbolic step of ending ED.

In an embodiment, in combination with any one of the preceding ones and shown with dashed lines in FIG. 8, the method 800 comprises a step of storing 814 in a respective database (either inside or outside the remote computer 200), by the data processing unit 201 of the remote computer 200, the value of the first physical magnitude G1 determined by the first calculation module M1, the value of the second physical magnitude G2 determined by the second calculation module M2 and the one or more values representative of the particulate emission EP determined by the third calculation module M3.

In an embodiment, in combination with any one of the preceding ones and shown with dashed lines in FIG. 8, the method 800 comprises a step of relating 815, by the data processing unit 201 of the remote computer 200, the one or more pieces of information of said plurality of information PI with data of respective databases stored in the respective memory unit 202, prepared in advance, to derive values and/or calculation coefficients to be supplied to said first M1, second M2 and third M3 calculation modules.

Examples of such databases were provided above.

In an embodiment, in combination with any one of those described above, the first physical magnitude G1 is a temperature TR of the vehicle braking system 1, defined above.

In this embodiment, the first subset S1 of the vehicle driving data DG comprises:
the speed VC of the vehicle 1.

In this embodiment, within the plurality of information PI:
said first information 11 comprise weather conditions CM;
said second information 12 comprise the slope PD of the road on which vehicle 1 is transiting;
said third information 13 comprise: weight of the vehicle 1; technical specifications ST of the braking system of the vehicle 1.

In an embodiment, in combination with the preceding one, the second physical magnitude G2 is a pressure PR present in the braking system of the vehicle 1 (e.g., the brake fluid pressure in the brake master cylinder).

In this embodiment, the second subset S2 of the driving data DG of the vehicle comprises:
the speed VC of the vehicle 1;
the acceleration AZ of the vehicle 1;
the deceleration DZ of the vehicle 1.

In this embodiment, within the plurality of information PI:
said first information 11 comprise the temperature TE eternal to the vehicle 1;
said second information 12 comprise the slope PD of the road on which vehicle 1 is transiting;
said third information 13 comprise: weight of the vehicle 1; technical specifications ST of the braking system of the vehicle 1.

In an embodiment, in combination with the preceding one, the third calculation module M3 has as input the temperature value TR determined by the first calculation module M1 and the pressure value PR determined by the second calculation module M2.

In this embodiment, the third subset S3 of the vehicle driving data DG comprises:
the speed VC of the vehicle 1;
the acceleration AZ of the vehicle 1;
the deceleration DZ of the vehicle 1.

In this embodiment, within the plurality of information PI:
said first information 11 comprise weather conditions CM;
said second information 12 do not comprise any information;
said third information 13 comprise: technical data DM referring to the materials of the brake pad and brake disc of the vehicle 1.

In an embodiment, in combination with any of those described above and shown with dashed lines in FIG. 8, the method 800 further comprises a step of determining 816, by the data processing unit 201 of the remote computer 200, a braking evaluation index IV based on said determined one or more values representative of the particulate emission EP due to the braking event EF.

The braking evaluation index IV is representative of the driver's braking performance, was defined above.

In an embodiment, in combination with the preceding one, the method 800 comprises a step of providing 817 the driver, by the data processing unit 201 of the remote computer 200, the determined braking rating index IV.

In an embodiment, shown in combination with the preceding one, the step of providing 817 the driver with the determined braking rating index IV is performed by the data processing unit 201 of the remote computer 200 in real time.

In an embodiment, in combination with any one of the preceding two, the determined braking evaluation index IV is provided to the driver by means of the user interface 5 of the portable electronic device 2 in the vehicle 1, in particular by means of the application software installed therein to employ the portable electronic device 2 about the vehicle 1 in the implementation of the system 100 and/or by means of a display module in the vehicle 1 operatively connected by means of a data communication network NTW (described above) to the remote computer 200.

For example, the braking evaluation index IV is displayed on the is portable electronic device 2 in the vehicle 1 by means of graphical indicators, such as traffic light, speedometer, and so on.

In an embodiment, in combination with any one of the preceding ones and shown with dashed lines in FIG. 8, the method 800 further comprises a step of determining 818, by the data processing unit 201 of the remote computer 200, a factor F-EP of particulate emission of the vehicle 1 during a set trip traveled based on the determined one or more values representative of the particulate emission EP due to the braking event EF for each braking event EF present along the set route.

As mentioned above, the factor F-EP of particulate emission is expressed as a value V1 representing the mass of particulate matter particles having a diameter either less than or equal to a set normalized value along the set route (e.g., $PM_{10}$/km).

In this embodiment, shown again with dashed lines in FIG. 8, the method 800 further comprises a step of determining 819 a distance traveled by the vehicle 1 during the set trip by the data processing unit 201 of the remote computer 200.

In an embodiment in combination with the preceding one, the distance covered by vehicle 1 during the set trip is determined by the data processing unit 201 of the remote computer 200, by means of an additional calculation module M4, based on a plurality of position data of the vehicle 1 included in the driving data DG of the vehicle 1 acquired by the plurality of sensors 6 of the portable electronic device 2 in vehicle 1.

If the acquisition frequency of the vehicle driving data DG exceeds a set reference frequency value, by non-limiting example, every 3 seconds, the distance covered by vehicle 1 during the set trip is determined by summing the geometric distances between the acquired individual position values.

In a further embodiment, either in combination with or alternatively to the preceding one, the distance covered by vehicle 1 during the set trip is determined by the data processing unit 201 of the remote computer 200 as the distance between a starting point and an ending point of a probable route, obtained by using external services (described above).

In a further embodiment, as an alternative to the preceding one, the distance covered by vehicle 1 during the set trip is determined by the data processing unit 201 of the remote computer 200 by means of a distance correction model.

An example of a distance correction model was described earlier.

In an embodiment, in combination with any one of the preceding ones which relate to the factor F-EP of particulate emission, the method 800 further comprises a step of providing 820 the driver, by the data processing unit 201 of the remote computer 200, with the determined factor F-EP of particulate emission.

In an embodiment, shown in combination with the preceding one, the step of providing 820 the driver with the determined factor F-EP of particulate emission is performed by the data processing unit 201 of the remote computer 200 in real time.

In an embodiment, in combination with either one of the preceding two, the determined factor F-EP of particulate emission is provided to the driver by means of the user interface 5 of the portable electronic device 2 in the vehicle 1, in particular by means of the application software installed therein to employ the portable electronic device 2 in the vehicle 1 in the implementation of the system 100 and/or by means of a display module in the vehicle 1 operatively connected by means of a data communication network NTW (described above) to the remote computer 200.

A further embodiment, in combination with any one of the preceding ones, the step of providing 813 the driver with the determined one or more values representative of the particulate emission EP due to the braking event EF is performed by the data processing unit 201 of the remote computer 200 in real time.

According to an embodiment, in combination with the preceding one, the determined one or more values representative of the particulate emission EP due to the braking event EF can be provided (either in real time or not in real time) to the driver by means of the user interface 5 of the portable electronic device 2 in the vehicle 1, in particular by means of the software application is installed therein to employ the portable electronic device 2 in the vehicle 1 in the implementation of the system 100, and/or by means of a display module of the vehicle 1 operatively connected by means of a data communication network NTW (described above) to the remote computer 200.

In an embodiment, in combination with any one of the preceding ones and shown with dashed lines in FIG. 8, the method 800 further comprises a step of providing 821 the driver, by the data processing unit 201 of the remote computer 200, with the determined value of the first physical magnitude G1 and the determined value of the second physical magnitude G2.

In an embodiment, in combination with the preceding one, the determined value of the first physical magnitude G1, and the determined value of the second physical magnitude G2 can be provided to the driver by means of the user interface 5 of the portable electronic device 2 in the vehicle 1, in particular by means of the application software installed therein to employ the portable electronic device 2 about the vehicle 1 in the implementation of the system 100 and/or by means of a display module in the vehicle 1 operatively connected by means of a data communication network NTW (described above) to the remote computer 200.

In an embodiment, in combination with any one of those described above and shown with dashed lines in FIG. 8, the method 800 further comprises a step of providing 822 the driver, by the data processing unit 201 of the remote computer 200, with further information representative of the driver's driving performance of the vehicle 1.

The further information representative of the driver's driving performance of the vehicle 1 have been defined and described above.

According to an embodiment, in combination with the preceding one, the further information representative of the driving performance of the vehicle 1 by the driver are provided to the driver by means of a display module of the vehicle 1 operatively connected, by means of a data communication network NTW (described above), to the remote computer 200, and/or by means of the user interface 5 of the portable electronic device 2 in the vehicle 1, in particular by means of the software application installed therein to employ the portable is electronic device 2 in vehicle 1 in the implementation of the system 100.

Such a display module can also be the portable electronic device 2 in the vehicle 1.

In an embodiment, in combination with any one of those described above and shown with dashed lines in FIG. 8, the method 800 further comprises a step of providing 823 the driver, by the data processing unit 201 of the remote computer 200, further information representative of the driver's driving style to.

The further information representative of the driver's driving style have been defined and described above.

In an embodiment, in combination with the preceding one, the further information representative of the driver's driving style are provided to the driver by means of the user interface 5 of the portable electronic device 2 in the vehicle 1, in particular by means of the application software installed therein to employ the portable electronic device 2 about the vehicle 1 in the implementation of the system 100 and/or by means of a display module in the vehicle 1 operatively connected by means of a data communication network NTW (described above) to the remote computer 200.

According to a further embodiment, in combination with any one of the proceeding ones and shown in FIG. 8 with dashed lines, the method 800 comprises a step of acquiring 824, by a second plurality of sensors 8 installed in the vehicle, at least one value of a further physical magnitude G3 of the braking system of the vehicle 1.

In this embodiment, the method 800 further comprises a step of providing 825, by a communication device 9 installed in the vehicle 1 operatively connected to said second plurality of sensors 8 installed in the vehicle, said at least one value of a further physical magnitude G3 of the vehicle braking system 1 to the remote computer 200.

In this embodiment, the step of determining 812 at least one value representative of the particulate emission EP, applying the third determination calculation module M3 of particulate emission, is performed by the data processing unit 201 of the remote computer 200, based also on the value of the is additional physical magnitude GR3.

Thereby, as mentioned above, if the further physical magnitude G3 were either one or the other between the first physical magnitude G1 or the second physical magnitude G2, the data processing unit 201 of the remote computer 200 would have that value available without having to resort to determination by means of the respective calculation module (M1 or M2).

With reference now to the figures, an example of implementation will now be described by a method of detecting and providing information representative of particulate emissions due to the use of a braking system of a vehicle, according to the present invention.

The driver enters, by means of user interface 5 of the portable electronic device 2 in the vehicle 1, the identification data DV of the vehicle 1 (e.g., brand and model), which will then be captured by portable electronic device 2 in vehicle 1.

During the trip of the vehicle 1, the plurality of the sensors 6 of the portable electronic device 2 in the vehicle 1 acquires driving data DG of the vehicle 1, e.g., position (latitude and longitude) of the vehicle 1, speed of the vehicle 1, acceleration of the vehicle 1, altitude of the vehicle 1.

A data processing module 3 of the portable electronic device 2 in the vehicle 1 stores in at least one memory module 4 of the portable electronic device 2 in the vehicle 1 the acquired driving data DG of the vehicle 1 as a first time series S-DG of points in which each point has respective driving data DG of the vehicle 1 associated therewith.

The portable electronic device 2 in the vehicle 1 is configured to send to the remote computer 200, during the trip of the vehicle 1, the driving data DG of the vehicle 1 stored as the first time series S-DG in the at least one memory module 4 of the portable electronic device 2 in the vehicle 1.

The data processing unit 201 of the remote computer 200 executes a first processing of the received driving data DG of the vehicle 1 to determine a representation of the vehicle driving data DG as a second time series S-EF of points, each representative of an actual braking event EF.

Each point has associated respective driving data DG of the vehicle 1.

In more detail, the data processing unit 201 of the remote computer 200:

applying to the received first time series S-DG of points (raw driving data DG of the vehicle 1) by the at least one data processing unit 201 of the remote computer 200, at least one noise reduction filter F-K (e.g., a Kalman filter) to reduce noise and increase quality, to obtain an intermediate time series S-DG' of points in which each point has associated driving data DG of the vehicle 1;

identifying within the filtered first intermediate time series S-DG', by means of the application of a set control logic L-C, the points corresponding to a braking event EF based on the driving data DG of the vehicle 1 associated with each point;

determining a further intermediate time series S-EF' of points each corresponding to an actual braking event EF by aggregating together the identified points corresponding to a braking event EF, each point having respective driving data DG of the vehicle 1 associated therewith;

applying to the further intermediate time series S-EF' a correctness and consistency check filter F-C to eliminate the points corresponding to errors and obtain the second time series S-EF (definitive dataset) of points.

The data processing unit 201 of the remote computer 200 stores the second time series S-EF in a memory unit 202 of the remote computer 200.

For each braking event represented by the points of the second time series S-EF, the data processing unit 201 of the remote computer 200 determines a value of a first physical magnitude G1 (e.g., the temperature) of the braking system of the vehicle 1, by applying a first calculation module M1 (algorithm or mathematical model) of said first physical magnitude G1, based on a first subset S1 of the driving data DG of the vehicle 1 of the point of the second time series S-EF corresponding to the braking event EF and one or more pieces of information of a plurality of information PI coming from sources external to the remote computer 200 and the portable electronic device 2 in the vehicle 1.

The plurality of information PI comprises first information 11 representative of the environment in which vehicle 1 is traveling, second information 12 representative of the road conditions in which vehicle 1 is traveling, and third information 13 of the production of the vehicle 1.

The first subset S1 of vehicle driving data DG comprises the speed VC of the vehicle 1.

The first information L1 comprise weather conditions CM.

The second information 12 comprise the slope PD of the road on which vehicle 1 is transiting.

The third information 13 comprise: weight MS of the vehicle 1; technical ST specifications ST of the braking system of the vehicle 1.

Afterwards, again for each braking event represented by the points of the second time series S-EF, the data processing unit 201 of the remote computer 200 determines a value of a second physical magnitude G2 (e.g., the pressure) of the braking system of the vehicle 1, by applying a second calculation module M2 (algorithm or mathematical model) of said second physical magnitude G2, based on a second subset S2 of the driving data DG of the vehicle 1 of the point of the second time series S-EF corresponding to the braking event EF and one or more pieces of information of said plurality of information PI coming from sources external to the remote computer 200 and the portable electronic device 2 in the vehicle 1.

The second subset S2 of the vehicle driving data DG comprises: speed VC of the vehicle 1; acceleration AZ of the vehicle 1; deceleration DZ of the vehicle 1.

The first information 11 comprise the temperature TE external to the vehicle 1.

The second information 12 comprise the slope PD of the road on which vehicle 1 is transiting.

The third information 13 comprise: weight MS of the vehicle 1; technical ST specifications ST of the braking system of the vehicle 1.

Afterwards, again for each braking event represented by the points of the second time series S-EF, the data processing unit 201 of the remote computer 200 determines one or more values representative of the particulate emission EP by applying a third calculation module M3 of particulate emission (algorithm or mathematical model), based on a third subset S3 of the driving data DG of the vehicle 1 of the point in the second time series S-EF corresponding to the braking event EF, the value of the first physical magnitude PR of the vehicle braking system 1, the value of the second physical magnitude TR of the braking system 1, and one or more pieces of information of said plurality of information PI coming from sources external to the remote computer 200 and the portable electronic device 2 in the vehicle 1.

The third subset S3 of the vehicle driving data DG comprises: speed VC of the vehicle 1; acceleration AZ of the vehicle 1; deceleration DZ of the vehicle 1.

The first information L1 comprise weather conditions CM.

The second information 12 do not comprise any information.

The third information 13 comprise: technical data DM referring to the materials of the brake pad and brake disc of the vehicle 1.

The one or more values representative of the particulate emission EP were provided above and comprise the value V1 representative of the mass of particulate matter particles having a diameter less than or equal to a set value (level of $PM_{10}$—mass in mg of particles in the air having a diameter of 1 micrometer or less).

The data processing unit 201 of the remote computer 200 provides the driver with the value V1 representative of the mass of particulate matter particles having a diameter either smaller than or equal to a set value in real time by means of the user interface 5 of the portable electronic device 2 in the vehicle 1, in particular by means of the software application installed therein to employ the portable electronic device 2 in the vehicle 1 in the implementation of the system 100.

The data processing unit 201 of the remote computer 200 stores in a respective database, the value of the first physical magnitude G1 (temperature) determined by the first calculation module M1, the value of the second physical magnitude G2 (pressure) determined by the second calculation module M2, and the value V1 representative of the mass of particulate matter particles having a diameter less than or equal to a set value determined by the third calculation module M3.

It is worth noting that the object of the present invention is fully achieved.

Indeed, after the acquisition of the driving data of the vehicle, which takes place with a set frequency of acquisition, the driving data of the vehicle are sent to a remote computer which executes the algorithms, relieving the portable electronic device in the vehicle (the driver's smartphone) from such a task so as not to limit the memory and battery thereof, being able instead to take advantage of more powerful processors for the computational part.

Furthermore, each software update is managed on the remote computer side, thus creating as few problems as possible for the user.

Furthermore, the determination of the level of particulate emissions linked to a braking system of the vehicle using the vehicle driving data detected by sensors on a smartphone in the vehicle and determined by means of computational modules (so-called virtual sensors), i.e., algorithms or mathematical models which, by taking advantage of the aforementioned data and data sources external to the physical medium on which the calculations are performed (databases, APIs, experimental parameters), increase the degree of information of the initial data, the accuracy and precision of the results obtained.

In order to meet contingent needs, those skilled in the art may make changes and adaptations to the embodiment of the method and related system described above or may replace elements with others which are functionally equivalent, without departing from the scope of the appended claims. All the features described above as belonging to a possible embodiment can be implemented irrespective of the other embodiments described.

The invention claimed is:

1. A method for detecting and providing information representative of particulate emissions due to use of a braking system of a vehicle, the method comprising, during a trip of the vehicle, steps of:

acquiring, by a portable electronic device in the vehicle, identification data of the vehicle entered by a driver of the vehicle;

acquiring, by a plurality of sensors of the portable electronic device in the vehicle, driving data of the vehicle during the trip of the vehicle;

storing in at least one memory module of the portable electronic device in the vehicle, by at least one data processing module of the portable electronic device in the vehicle, the acquired driving data of the vehicle as a first time series of points in which each point has respective driving data of the vehicle associated therewith;

sending to a remote computer, by the portable electronic device in the vehicle, the driving data of the vehicle stored as the first time series in the at least one memory module of the portable electronic device in the vehicle;

performing, by a data processing unit of the remote computer, a first processing of the received driving data of the vehicle to determine a representation of the driving data of the vehicle as a second time series of points, each representative of an actual braking event, each point having respective driving data of the vehicle associated therewith;

for each braking event represented by the points of the second time series, the method comprising, by the data processing unit of the remote computer, steps of:

determining a value of a first physical magnitude of the braking system of the vehicle, by applying a first calculation module of said first physical magnitude, based on a first subset of the driving data of the vehicle of the point of the second time series corresponding to the braking event and one or more pieces of information of a plurality of information coming from sources external to the remote computer and the portable electronic device in the vehicle, said plurality of information comprising first information representative of an environment in which the vehicle is traveling on a route, second information representative of road conditions in which the vehicle is traveling on the route, and third information of production of the vehicle;

determining a value of a second physical magnitude of the braking system of the vehicle, by applying a second calculation module of said second physical magnitude, based on a second subset of the driving data of the vehicle of the point of the second time series corresponding to the braking event and one or more pieces of information of a plurality of information coming from sources external to the remote computer and the portable electronic device in the vehicle;

determining one or more values representative of a particulate emission due to the braking event, by applying a third calculation module of the particulate emission, based on a third subset of the driving data of the vehicle of the point in the second time series corresponding to the braking event, the value of the first physical magnitude of the braking system, the value of the second physical magnitude of the braking system, and the one or more pieces of information of said plurality of information coming from the sources external to the remote computer and the portable electronic device in the vehicle; and providing the driver, by the portable electronic device in the vehicle, with the determined one or more values representative of the particulate emission due to the braking event.

2. The method of claim 1, further comprising a step of storing in a respective database, by the data processing unit of the remote computer the value of the first physical magnitude determined by the first calculation module, the value of the second physical magnitude determined by the second calculation module and the one or more values representative of the particulate emission determined by the third calculation module.

3. The method of claim 1, further comprising a step of putting into relation, by the data processing unit of the remote computer, the one or more pieces of information of said plurality of information with data of respective databases stored in a respective memory unit, prepared in advance, to derive values and/or calculation coefficients to be supplied to said first, second and third calculation modules.

4. The method of claim 1, wherein the first physical magnitude is a temperature of the braking system of the vehicle.

5. The method of claim 1, wherein the second physical magnitude is a pressure present within the braking system of the vehicle.

6. The method of claim 1, further comprising steps of:
determining, by the data processing unit of the remote computer, a braking rating index based on said determined one or more values representative of the particulate emission due to the braking event; and
providing the driver, by the data processing unit of the remote computer, with the determined braking rating index.

7. The method of claim 6, wherein the step of providing the driver with the determined braking rating index is performed by the data processing unit of the remote computer in real-time.

8. The method of claim 7, wherein the determined braking rating index is provided to the driver by a user interface of the portable electronic device in the vehicle and/or by a vehicle display module operatively connected, by a data communication network, to the remote computer.

9. The method of claim 1, further comprising a step of determining, by the data processing unit of the remote computer, a particulate emission factor of the vehicle during a set route traveled based on the determined one or more values representative of the particulate emission due to the braking event for each braking event present along the set route.

10. The method of claim 9, further comprising a step of determining a distance traveled by the vehicle during the set route by the data processing unit of the remote computer.

11. The method of claim 10, further comprising a step of providing the driver, by the data processing unit of the remote computer, with the determined particulate emission factor of the vehicle.

12. The method of claim 11, wherein the step of providing the determined particulate emission factor of the vehicle is performed by the data processing unit of the remote computer in real-time.

13. The method of claim 12, wherein the determined particulate emission factor of the vehicle is provided to the driver by a user interface of the portable electronic device in the vehicle and/or by a vehicle display module operatively connected, by a data communication network, to the remote computer.

14. The method of claim 1, wherein the step of providing the driver with the determined one or more values representative of the particulate emission due to the braking event is performed by the data processing unit of the remote computer in real-time.

15. The method of claim 14, wherein the determined one or more values representative of the particulate emission due to the braking event are provided to the driver by a user interface of the portable electronic device in the vehicle and/or by a vehicle display module operatively connected, by a data communication network, to the remote computer.

16. The method of claim 1, further comprising a step of providing the driver, by the data processing unit of the remote computer, with the determined value of the first physical magnitude and the determined value of the second physical magnitude, the determined value of the first physical magnitude and the determined value of the second physical magnitude being provided to the driver by a user interface of the portable electronic device in the vehicle and/or by a vehicle display module operatively connected, by a data communication network, to the remote computer.

17. The method of claim 1, further comprising a step of providing the driver, by the data processing unit of the remote computer, with further information representative of a driving performance of the vehicle by the driver, the further information representative of the driving performance of the vehicle by the driver being provided to the driver by a vehicle display module operatively connected, by a data communication network, to the remote computer, and/or by a user interface of the portable electronic device in the vehicle.

18. The method of claim 1, further comprising a step of providing the driver, by the data processing unit of the remote computer, further information representative of a driving style of the driver, the further information representative of the driving style of the driver being provided to the driver by a user interface of the portable electronic device in the vehicle, and/or by a vehicle display module operatively connected, by a data communication network, to the remote computer.

19. The method of claim 1, further comprising steps of:
acquiring, by a second plurality of sensors installed in the vehicle, at least one value of a further physical magnitude of the braking system of the vehicle;
providing, by a communication device installed in the vehicle operatively connected to said second plurality of sensors installed in the vehicle, said at least one value of the further physical magnitude of the braking system of the vehicle to the remote computer, and
determining one or more values representative of the particulate emission due to the braking event, by applying the third calculation module of the particulate emission, the step of determining the one or more values representative of the particulate emission being performed by the data processing unit of the remote computer, based also on the at least one value of the further physical magnitude.

20. The method of claim 1, wherein the step of performing the first processing of the received driving data of the vehicle to determine the representation of the driving data of the vehicle as the second time series of points comprises:
applying to the received first time series of points by the data processing unit of the remote computer, at least one noise reduction filter to reduce noise and increase quality, to obtain an intermediate time series of points in which each point has respective driving data of the vehicle associated therewith;
identifying, by the data processing unit of the remote computer, within the filtered intermediate time series, by application of a set control logic, the points corresponding to a braking event based on the driving data of the vehicle associated with each point;
determining, by the data processing unit of the remote computer, a further intermediate time series of points each corresponding to an actual braking event by aggregating together the identified points of the first intermediate time series corresponding to the braking event, each point having respective driving data of the vehicle associated therewith; and
applying to the further intermediate time series, by the data processing unit of the remote computer, a correctness and consistency check filter to eliminate points corresponding to errors and obtain the second time series of points.

21. A system for detecting and providing information representative of particulate emissions due to use of a braking system of a vehicle, during a trip of the vehicle, the system comprising:
a portable electronic device in the vehicle, the portable electronic device comprising:
at least one data processing module;
at least one user interface;
a plurality of sensors operatively connected to the data processing module; and
a remote computer configured to communicate data with the portable electronic device by a data communication network, the remote computer comprising at least one data processing unit,
the system being configured to perform the method of claim 1.

* * * * *